United States Patent Office 2,957,037
Patented Oct. 18, 1960

2,957,037

THERMOCOUPLE

Chester T. Sims, Ballston Lake, N.Y., assignor, by mesne assignments, to The Battelle Development Corporation, Columbus, Ohio, a corporation of Delaware No Drawing. Filed July 16, 1959, Ser. No. 827,458

5 Claims. (Cl. 136—5)

This invention relates to temperature measuring devices, and, more particularly, to thermocouple devices capable of measuring extremely high temperatures, for example, temperatures in the range of from 1500 to 2500° C., or even higher.

It has long been known that when two wires or bars of dissimilar metals are joined at their extremities, an electric current can be produced by the direct action of heat on the juncture. Devices for applying this principle to the measurement of temperature, or of temperature differences, are known as thermocouples. Such devices ordinarily comprise simply two wires of dissimilar metal joined together at one end and connected to a current-detecting instrument at the other end. Protective tubes of ceramic or other refractory material are often provided to protect the thermocouple from the direct action of high temperatures, corrosive atmospheres, molten metals, etc.

Thermocouple devices are limited in their applications to uses involving temperatures below the melting point of the metals used to form the couple. Other factors which limit the applicability of thermocouple devices include the resistance of a couple metal to attack by molten metal or corrosive gases, the ductility of the couple metals and other mechanical properties of the couple metal. In the past, thermocouples for commercial or ordinary industrial application have been of the so-called "base-metal" type. Usual base-metal thermocouple combinations include the Chromel-Alumel, the iron-constantan, and the copper-constantan couples. The Chromel-Alumel couple is reliable up to about 1200° C., the iron-constantan up to about 780° C., and the copper-constantan couple up to about 350° C. For certain special applications, particularly at high temperatures, and for laboratory or industrial measurements requiring the highest precision, noble-metal thermocouples are used. Perhaps the most satisfactory of these has been the Le-Chatelier couple which is made up of a positive wire containing 90 percent platinum and 10 percent rhodium, and a negative wire of pure platinum (also referred to as the platinum-platinum-rhodium couple). This couple has an operative range of from 250 to 1650° C. Its most obvious disadvantage is its cost. Also, its operative range, although superior to that of most known thermocouples, is far short of the most desirable operating range.

Recent investigations of the properties and characteristics of pure rhenium metal have resulted in the discovery that thermocouples including an element of pure rhenium metal provide excellent high-temperature measuring devices. High thermal E.M.F.'s are generated by rhenium against tungsten and rhenium against molybdenum in thermocouple applications. These couples are useful for measuring temperatures up to about 2800° C. However, rhenium metal is extremely expensive and, furthermore, pure rhenium metal is very difficult to fabricate into wire, such as is needed for the preparation of a thermocouple.

It has now been discovered that high temperature thermocouples possessing certain advantages over rhenium thermocouples, while retaining the desirable features and characteristics of such couples can be prepared using elements of tungsten alloyed with rhenium or elements of molybdenum alloyed with rhenium.

It is, therefore, an object of this invention to provide improved high-temperature thermocouples, one element of which is a rhenium-alloy composition.

It is a further object of this invention to provide thermocouples which are operative in temperature ranges extending up to 2500° C. and beyond.

Still another object of this invention is to provide a thermocouple which will produce a substantial electromotive force at temperatures in the range of from 1500 to 2500° C.

Still another object of this invention is to provide a thermocouple which will produce substantial electromotive force at a uniform rate over an extended temperature range.

Yet another object of this invention is to provide thermocouples for high-temperature precision measurements which are economically feasible.

Finally, it is an object of this invention to provide thermocouples whose elements are readily fabricated into wire or other forms suitable for thermocouples.

Other objects and advantages of the present invention will be apparent in view of the following detailed disclosure and description thereof.

In general, this invention comprises thermocouples wherein one element is a refractory metal selected from the group consisting of tungsten and molybdenum, and the other element is an alloy of rhenium and a refractory metal selected from the group consisting of tungsten and molybdenum, said elements being connected together at one end.

Thermocouples of the present invention offer many important advantages. In the first place, all of the components of the couples have very high melting points. This means that the couples may be used for measuring high temperatures without danger of melting one of the thermoocuple components. Also, the couples of this invention provide high thermocouple potential and high thermoelectric power, both of which are critical to sensitivity and precision of temperature measurements.

Thermocouple elements were prepared from the following alloys:

(1) Tungsten-30 atomic percent rhenium and
(2) Molybdenum-35 atomic percent rhenium.

The performance of these elements was observed according to the following procedure:

Measurements were conducted in a vacuum chamber at a pressure of about $10^{-4}$ millimeters of mercury. The high-temperature "furnace" consisted of a ¾-inch-diameter by 7-inch-long by 0.01-inch-thick resistance-heated, vertically mounted tantalum sleeve. The sleeve was flattened at the ends to make electrical contact with water-cooled electrodes and was constructed with a $\frac{1}{16}$-inch slit down one side, so that the black wall temperature could be read with an optical pyrometer giving black body conditions. A single thermocouple bead was constructed by welding together in a helium atmosphere the ends of rhenium, tungsten, molybdenum, tungsten-30 rhenium, and molybdenum-35 rhenium wires. These were led out of the vacuum chamber through a seal. The bead was located in the center of the tantalum tube and heated by radiation from the tube. A platinum-platinum-rhodium couple was placed in the tube so that the precious metal couple bead rested directly on the experimental couple bead. Temperature measurements were made by reading the experimental bead and the black wall temperature with a calibrated optical pyrometer at all temperatures for which measurement was made, and by the use of the platinum-platinum-rhodium couple up to 1600° C. The bead and black wall temperature were optically identical above about 1400° C. The E.M.F. was recorded on a semiprecision potentiometer through a thermocouple switching box. A total of 8 runs was made. The readings actually recorded were in every instance for one of the elements, tungsten, molybdenum, tungsten-30 rhenium, or molybdenum-35 rhenium against the pure rhenium element. Since all of the materials were thus observed against pure rhenium, the E.M.F. for couples of tungsten versus tungsten-30 rhenium and molybdenum versus molybdenum-35 rhenium could be "calculated" by subtraction. When this was done the results obtained were as tabulated below in Table I.

*Table 1*

| Black-Body Temperature, °C. | Electromotive Force [1] (millivolts) | |
| --- | --- | --- |
| | W–W–30 Re | Mo–Mo–35 Re |
| 200 | 1 | 1.5 |
| 400 | 3.5 | 4 |
| 600 | 6.5 | 7.5 |
| 800 | 10.25 | 10.75 |
| 1,000 | 14.25 | 14.25 |
| 1,200 | 19.25 | 17.5 |
| 1,400 | 24 | 20.5 |
| 1,600 | 28.5 | 22.5 |
| 1,800 | 32.75 | 24.5 |
| 2,000 | 37 | 26 |

[1] Computed from observed values for Re–W–30 Re, Re–W, Re–Mo and Re–Mo–35 Re.

The values presented in Table I above show that the tungsten versus tungsten-30 rhenium couple is of particular interest. It has nearly linear behavior from about 600 to at least 2000° C. and has one of the highest thermol E.M.F.'s for refractory metal couples ever observed. The thermoelectric power is also very high.

In view of the results tabulated in Table I above and in view of the known fabricability properties of alloys of tungsten and molybdenum with rhenium, it can be said that the following alloy ranges will be suitable for thermocouple elements:

(1) Tungsten-rhenium alloys, from 20 to 30 atomic percent rhenium.

(2) Molybdenum-rhenium alloys, from 20 to 35 atomic percent rhenium.

Since the molybdenum-rhenium alloys are ductile in the recrystallized condition at room temperature and since the tungsten-rhenium alloy is much more ductile than pure tungsten, these couples will have the advantages of excellent mechanical properties, thus permitting service under severe mechanical conditions. In addition to their improved workability, as compared with pure rhenium metal, these alloy compositions also possess the advantage of economic feasibility in view of the relative inexpensiveness of molybdenum and tungsten as compared with rhenium metal.

The thermocouples of this invention are potentially useful up to about 2500° C. and possibly even higher. The linear characteristic of the tungsten versus tungsten-30 rhenium couple makes it especially desirable for high-temperature measuring applications.

New and useful temperature-measuring devices having been described and disclosed, it is desired to further define the present invention by means of the attached claims.

What is claimed is:

1. A thermocouple which comprises one element composed of refractory metal selected from the group consisting of tungsten and molybdenum and another element composed of an alloy of rhenium and a refractory metal selected from the group consisting of tungsten and molybdenum.

2. A thermocouple which comprises one element composed of tungsten and another element composed of an alloy of tungsten and 20 to 30 atomic percent rhenium, said elements being joined at one end.

3. A thermocouple which comprises one element composed of tungsten and another element composed of an alloy of tungsten and 30 atomic percent rhenium said elements being joined at one end.

4. A thermocouple which comprises one element composed of molybdenum and another element composed of an alloy of molybdenum and 20 to 35 atomic percent rhenium, said elements being joined at one end.

5. A thermocouple which comprises one element composed of molybdenum and another element composed of an alloy of molybdenum and 35 atomic percent rhenium, said elements being joined at one end.

References Cited in the file of this patent

UNITED STATES PATENTS 2,406,172　　Smithells _____ Aug. 20, 1946

FOREIGN PATENTS 1,148,278　　France _____ Dec. 5, 1957